US012600477B2

(12) United States Patent
Malgarini

(10) Patent No.: US 12,600,477 B2
(45) Date of Patent: Apr. 14, 2026

(54) WALL INCLUDING FIRST AND SECOND COMPARTMENTS AND TABLE FOR AIRCRAFT SEAT BACKREST

(71) Applicant: GOOOD S.R.L., Latina (IT)

(72) Inventor: Ascanio Malgarini, Latina (IT)

(73) Assignee: GOOOD S.R.L., Latina (IT)

( * ) Notice: Subject to any disclaimer, the term of this patent is extended or adjusted under 35 U.S.C. 154(b) by 83 days.

(21) Appl. No.: 18/626,155

(22) Filed: Apr. 3, 2024

(65) Prior Publication Data

US 2025/0115356 A1     Apr. 10, 2025

(30) Foreign Application Priority Data

Apr. 4, 2023    (IT) ........................ 102023000006606

(51) Int. Cl.
B64D 11/00          (2006.01)
B64D 11/06          (2006.01)

(52) U.S. Cl.
CPC .... B64D 11/00151 (2014.12); B64D 11/0638 (2014.12)

(58) Field of Classification Search
CPC .......... B64D 11/00151; B64D 11/0638; B64D 11/0627; B64D 11/0691; B64D 11/0698; B60N 3/004; B60N 3/305; B60R 2011/0015
See application file for complete search history.

(56) References Cited

U.S. PATENT DOCUMENTS

| | | | |
|---|---|---|---|
| 9,573,687 B2 * | 2/2017 | Stephens ............ | B64D 11/0638 |
| 9,919,802 B2 * | 3/2018 | Stephens .......... | B64D 11/00151 |
| 10,625,649 B2 * | 4/2020 | Buchanan ................ | A47B 1/10 |
| 2006/0175882 A1 | 8/2006 | Schweizer | |

(Continued)

FOREIGN PATENT DOCUMENTS

| | | |
|---|---|---|
| EP | 1663781 B1 | 4/2012 |
| EP | 3227183 B1 | 10/2017 |

(Continued)

OTHER PUBLICATIONS

Extended European Search Report issued in European Patent Application No. 24168177.4, dated Sep. 10, 2024 in 7 pages.

(Continued)

*Primary Examiner* — Arfan Y. Sinaki
(74) *Attorney, Agent, or Firm* — Knobbe, Martens, Olson & Bear, LLP

(57) ABSTRACT

A wall for backrest of aircraft seats includes a the first storage compartment can house a monitor and have two lateral portions including an upper portion and a lower portion; a hinge with a rotational rigidity; a table having a main plane and one end bound to the wall by the hinge, and a second storage compartment arranged at a lateral portion of the first storage compartment. The wall further includes a lateral guide arranged in correspondence with the lower portions of the two storage compartments. The hinge is constrained to slide on the lateral guide. In a first "closed" configuration the table is arranged inside the second storage compartment to form a single continuous rear surface. In a second "open" configuration, the table is arranged transversely to the rear surface of the wall free to translate along the lateral guide.

13 Claims, 3 Drawing Sheets

(56)  References Cited

U.S. PATENT DOCUMENTS

2016/0249073  A1      8/2016  Margis
2017/0021931  A1      1/2017  Stephens

FOREIGN PATENT DOCUMENTS

EP              3583030  B1      4/2022
EP              4074600  A1    10/2022
WO      WO 2015/104527  A1      7/2015

OTHER PUBLICATIONS

Search Result for IT Application No. 102023000006606, mailed Sep. 15, 2023.

Office Action dated Mar. 14, 2025 in U.S. Appl. No. 18/626,142, 15 pages.

Search Report for IT Application No. 102023000006618, dated Sep. 28, 2023.

* cited by examiner

WALL INCLUDING FIRST AND SECOND COMPARTMENTS AND TABLE FOR AIRCRAFT SEAT BACKREST

The present invention concerns a seat wall for airliners, in particular for business class seat backrests.

As is well known from the state of the art seats and suites for passengers on airliners, particularly business class, generally comprise a series of accessories (monitors, work surfaces, compartments for positioning objects, . . . ) for the use and comfort of passengers. Some of these accessories are fixed in position and ready for use, given the safety regulations in force, others are permanently fixed to other surfaces and move between the positions of use and those of storage, still others are free from couplings and must be stored in compartments when not in use.

In fact, it is known to provide airline passengers with a table with a surface to use for eating or working during the flight. The table must therefore be stowed during some phases of the flight, for example during take-off and landing, in order to allow passengers to exit the seats without obstacles in the event of an emergency. Aircraft interior tables are typically integrated vertically into a side protrusion of the cabin and the movement required to position the table in operating mode presents one of the main challenges of integrating the table into aircraft seating.

For this reason, table solutions of this type are currently available which improve the space available inside the aircraft, for example the table panels can be rotated around a hinge, so as to be able to obtain an intermediate folding condition, so as to provide the occupant of the aircraft seat with minimal obstruction in front.

An example of prior art solutions is described in patent document US 2017/0021931 A1.

In the state of the art it is therefore clear that one of the main problems in the design of these accessories is the interaction between them and their spatial arrangement within the available space. In fact, usually reconciling the limitations of weight, component sizing, and passenger ergonomics represents the main challenge for the integration of said accessories in said airliner seats.

A further problem of the prior art is that of having to guarantee a functional structure for use by the passenger as both an active element, such as a working surface, and a passive one, such as the use of a monitor for multimedia products, reducing the bulk of these accessories to give the passenger greater space and freedom during the flight.

The purpose of the present invention is to overcome the prior art problems previously highlighted, in particular that of integrating into a single structural element various accessories necessary and foreseen in a modern business class seat, such as multimedia tools, functional surfaces for working and, at the same time, for the consumption of food and drinks and spaces for storing personal items.

A further purpose of the present invention is to overcome the above-mentioned problems of the prior art by using the smallest possible size, in order to be able to give more space to the passenger to improve the travel experience and the perception of freedom of movement during the flight.

An additional purpose is to provide these services in a simple and intuitive configuration for the passenger, in order to allow them to be used quickly and easily, for example without requiring the intervention of specialized personnel and the installation of electronic devices.

It is therefore object of the present invention a wall for backrest of aircraft seats comprising a rear surface on which are formed a first storage compartment and a second storage compartment, said first storage compartment being configured to house a monitor and being rigidly arranged in said wall having two lateral portions, an upper portion and a lower portion having a direction of development parallel to a first axis, said wall further comprising a hinge, having a rotational rigidity, arranged at said wall, and a table having one end bound to said hinge, said table being free to rotate about the axis of said hinge, and comprising a main plane, said second storage compartment being arranged adjacent to said first storage compartment, for positioning said table, said wall being characterised in that said second storage compartment is arranged at one of said lateral portions of said first storage compartment, in further comprising a lateral guide, having a development parallel to said first axis, said lateral guide being arranged in correspondence with the lower portions of said first and second storage compartments, wherein said hinge is constrained by sliding on said lateral guide in such a way as to translate along said axis parallel to said first axis, in that said table is apt to assume a first "closed" configuration, wherein said table is arranged inside said second storage compartment so that said wall has a single continuous rear surface, and a second "open" configuration, wherein said table is arranged transversely with respect to said rear surface of said wall and is free to translate along said axis parallel to said first axis on said lateral guide.

In particular, according to the invention said monitor may be housed within said first storage compartment.

Always according to the invention, said second storage compartment may comprise within it an object compartment.

Still according to the invention, said table may comprise a support plane, acting as a support element of said table and rigidly constrained at said hinge at least one rail, having a linear development along a development direction of said support plane, and wherein said main plane is apt to translate along said support plane by sliding along said at least one rail.

In particular according to the invention, said table may comprise at least one connecting element having a substantially "C" cross-section and an end rigidly constrained to said hinge and a further end rigidly constrained to said support plane.

Always according to the invention, said table further may comprise at least one further hinge, arranged at an edge of said main plane, an additional surface, constrained to said at least one further hinge at its edge, apt to rotate about the axis of said at least one further hinge.

Still according to the invention, at a corner of said wall a snap coupling mechanism may be arranged, apt to reversibly couple an end portion of said table with said wall, when said table assumes said "closed" configuration.

In particular is arranged a first friction system may be present at said hinge, for increasing the torsional stiffness of the hinge connection between said table and said hinge.

Always is arranged in said main plane there may be a second friction system for adjusting the stroke of said main plane on said at least one rail.

Still according to the invention, in said wall at said lateral guide there may be a third friction system for adjusting the stroke of said table by said hinge on said lateral guide.

In particular according to the invention, said friction systems may be a plurality of inserts loaded by calibrated springs.

It is further object of the present invention a seating assembly for aircraft comprising at least one first passenger seat comprising a backrest of said seat, being characterised on comprising a wall according to any one of the preceding claims arranged in correspondence with said backrest of said first seat.

Always according to the invention, a secondary seating assembly may comprise further a second seating seat for passengers arranged rearly to said first seating seat.

The present invention will be now described, for illustrative but not limitative purposes, according to its preferred embodiments, with particular reference to the figures of the enclosed drawings, wherein.

Figures 1, 2:
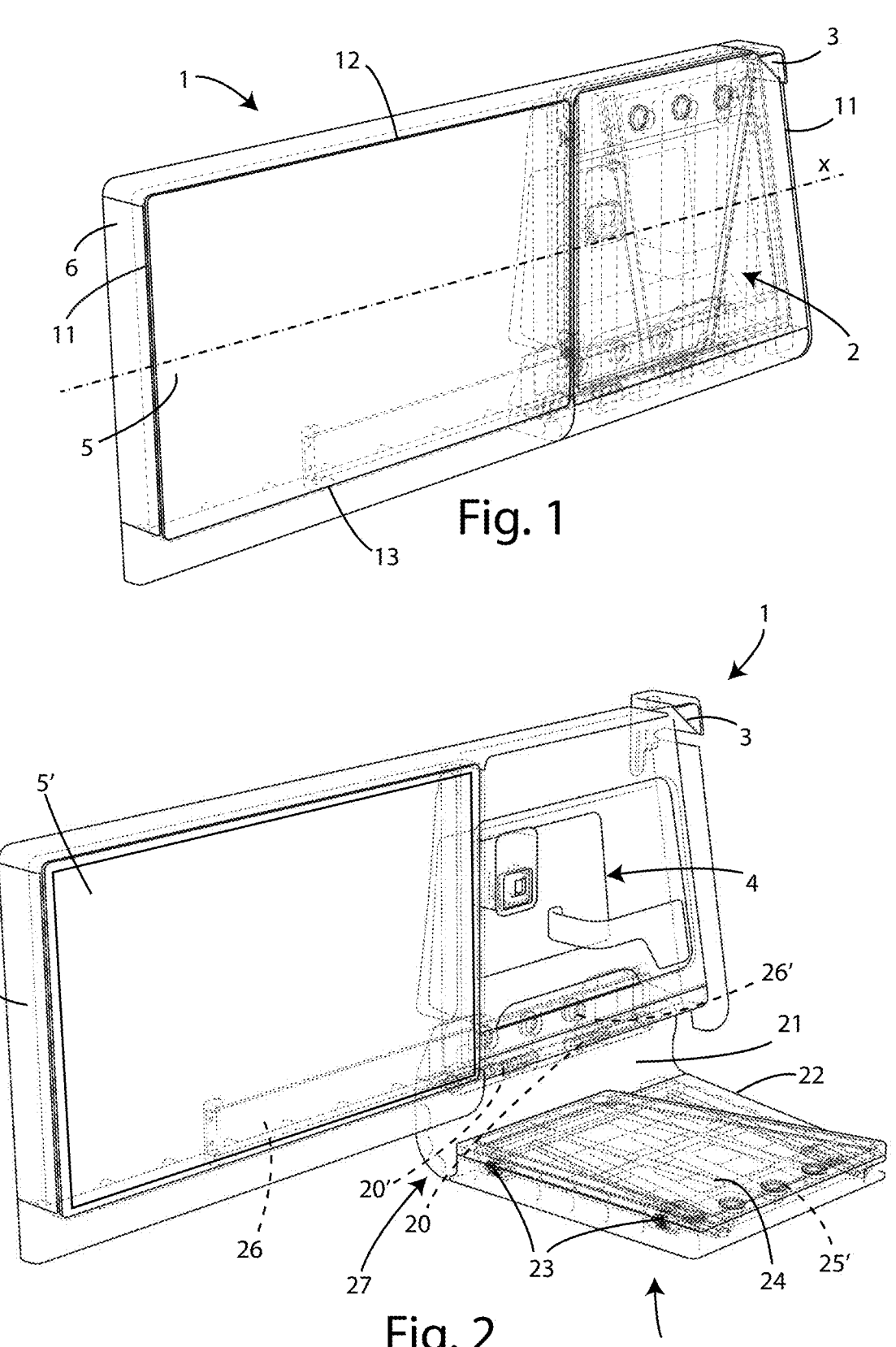
FIG. 1 shows a perspective view of the wall according to the invention in a closed use configuration.
FIG. 2 shows a perspective view of the wall of FIG. 1 in an intermediate use configuration.
Figure 3:
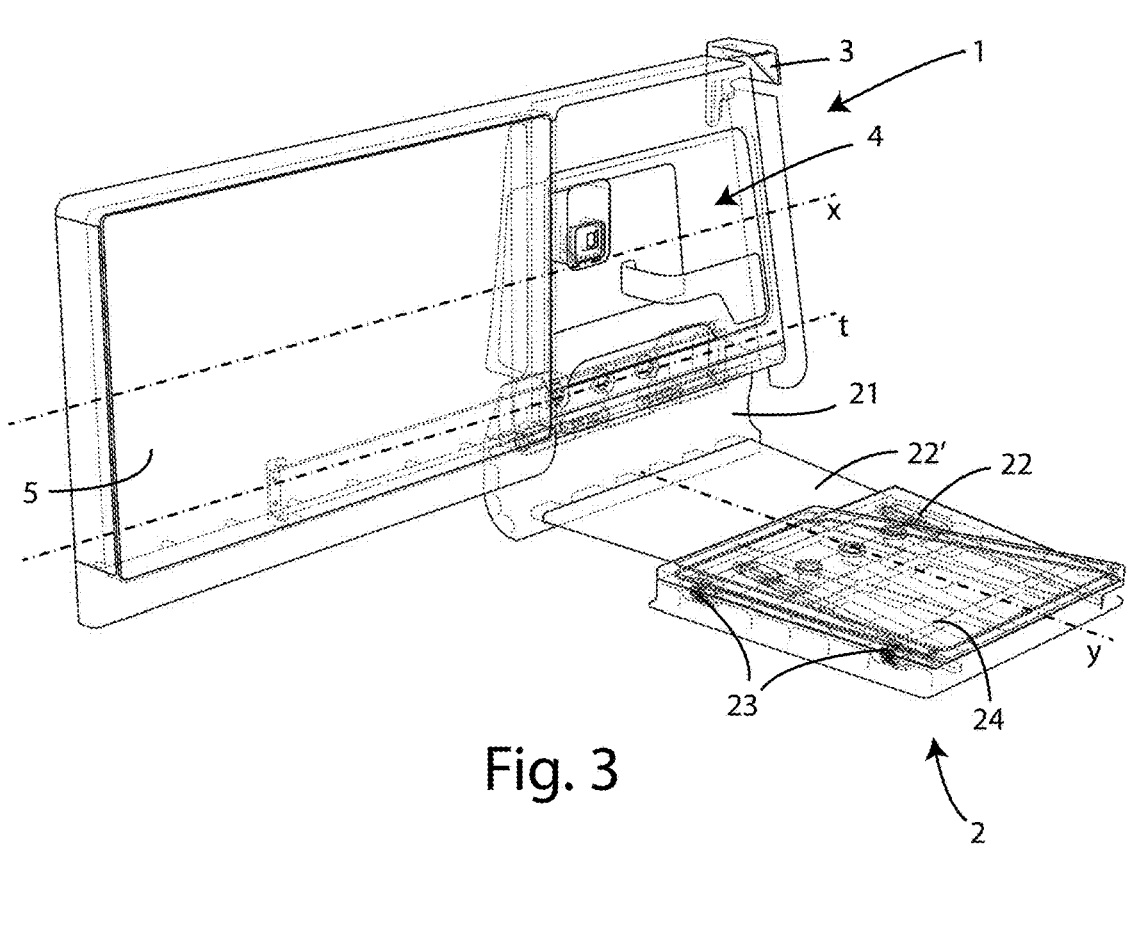
FIG. 3 shows a perspective view of the wall of FIG. 1 in a second intermediate use configuration.
Figure 4:
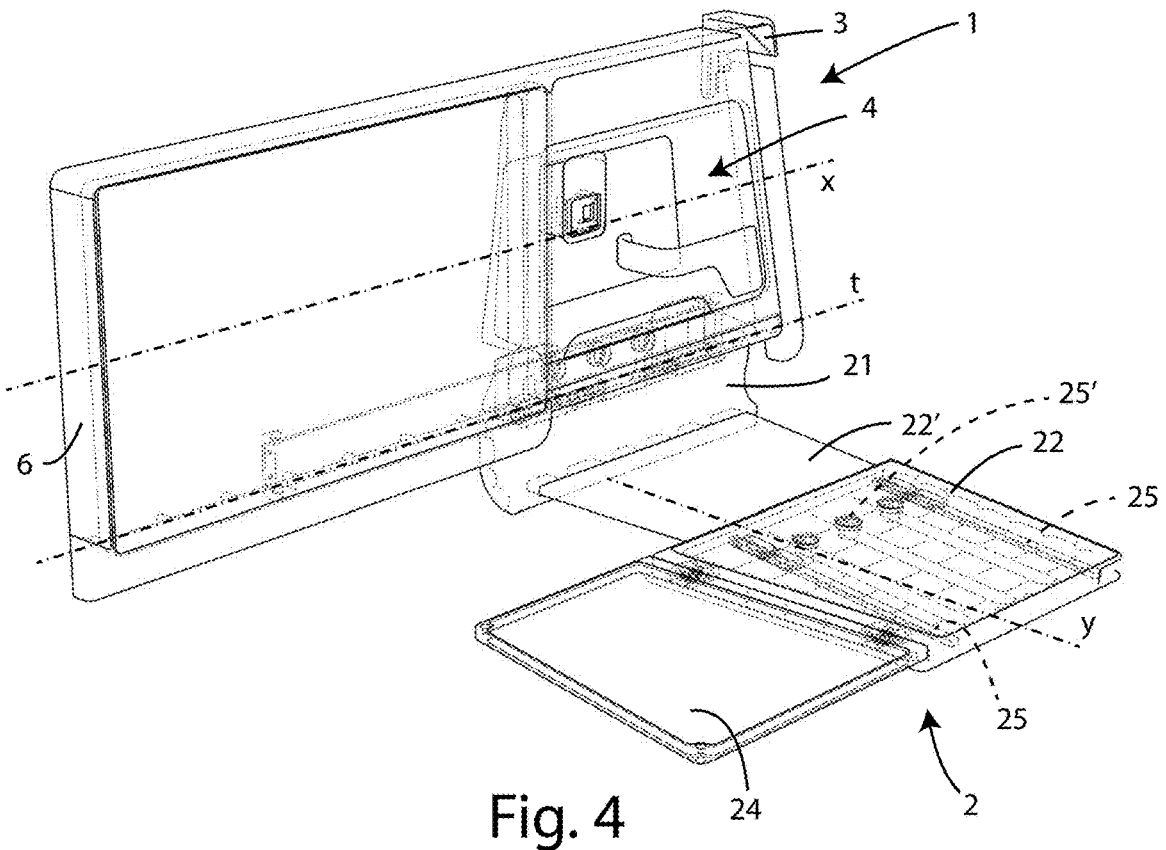
FIG. 4 shows a perspective view of the wall of FIG. 1 in an open use configuration.

Observing FIGS. 1-6, a wall for backrests 200 of seats 100 for aircraft according to the invention, indicated with the numerical reference 1, is shown.

The wall 1 according to the invention is configured as an assembly of components and comprises two storage compartments, a first storage compartment 5, designed for the storage and installation of a monitor 5', in particular a video monitor, to allow the passenger to use a multimedia entertainment service during the flight and a second storage compartment 7, located adjacent, in particular laterally, to the first compartment 5, creating a single body of the wall 1.

The wall 1, like the two storage compartments 5 and 7, has a substantially rectangular shape 6, therefore presenting two lateral portions 11 and an upper 12, lower 13 portion, in particular the latter two extending along an extension axis t parallel to a first axis or horizontal axis x, perpendicular to a second axis or vertical axis y, representing the other direction of extension of the wall 1. Said first x-axis and second y-axis define an xy plane that is parallel to the surface of wall 1, a flat and substantially continuous surface when said wall 1 is in its closed configuration for use.

With reference to FIGS. 1-5, the wall 1 comprises a table 2, composed of various elements described extensively below, which is suitable for use in a "closed" configuration (shown in FIG. 1), in which it is placed in the second storage compartment 7, and in an "open" configuration (shown in FIG. 2), in which it substantially forms a 90° angle with the surface of the wall 1. This "open" configuration is designed for use by the passenger of the table during the flight, such as a work surface or for consuming food or drinks during the flight. Said second storage compartment 7 performs a double function based on the configuration of use of said table 2: when it is in said "closed" configuration, it contains said table 2, while when the table 2 is in an "open" configuration the second storage compartment 7 comprises an object compartment 4 within it, to allow the passenger to store his personal objects when using the table 2 during the flight.

Said table 2 is connected to the wall 1 by a hinge 20, positioned in a lower portion of the wall 1 (in particular inside the wall 1 to minimize the total size of the wall 1), which allows positioning between the two configurations of use described above. In fact, by rotating the table 2 through an angle between 0° and 90°, advantageously without the aid of any electronic components, and therefore easily and intuitively, the passenger can place the table 2 inside the second storage compartment 7 (configuration "closed") or in the "open" configuration.

The closing of the table 2 in the "closed" configuration is further facilitated by the presence of a snap coupling mechanism 3 for the interlocking coupling of the table 2 with the wall 1. Specifically, the snap coupling mechanism 3 is placed in the upper lateral corner of the wall 1 in order to couple reversibly with a respective corner of a surface of the table 2, and under the action of the passenger it allows the decoupling between wall 1 and table 2, allowing the latter to "fall" by rotating with respect to the hinge 20, for positioning the table 2 itself in said "open" configuration. Advantageously, the snap coupling mechanism 3 represents an easy, intuitive and reliable coupling system, suitable for fastening the table 2 to the wall 1 during the flight phases in which the mobile elements of the seats 100 must, given the safety regulations in force, remain stationary and positioned in seats 100 of aircraft.

Since the second housing compartment 7 is located laterally adjacent to said first housing compartment 5, and therefore also to the monitor 5', it allows the creation, when the table 2 is in said "closed" configuration, of a wall 1 having a single surface substantially continuous, minimizing the bulk of the wall 1 itself, both real and perceived by the passenger during its use.

The wall 1 also has inside it, always in correspondence with its lower portion, a lateral guide 26, which allows the translation of the elements fastened to it. In fact, the hinge 20 mentioned above, which allows the table 2 to assume said two configurations of use, is slidingly constrained to the lateral guide 26, which through the use of rails allows the free translation of the table 2 along an extension axis t parallel to the first axis x, when in "open" configuration of use. In this open configuration, the table 2 can be arranged below said first storage compartment 5 or said second storage compartment 7.

It is therefore understandable how the lateral guide 26 allows a virtually infinite number of variations of the "open" configuration of the table 2, in fact the translation of the table 2, limited by the maximum motion of the lateral guide 26, advantageously allows the passenger to adjust the positioning of the table 2 according to the own needs, having more or less space available in front and also allows to move the table 2 easily and quickly in case of an emergency to evacuate the seat 100.

Said table 2, again with reference to FIGS. 1-5, connected to the wall 1 via said hinge 20, has various elements connected to each other to allow the space available in the passenger seat 100 to be exploited to the fullest.

In detail, the table 2 is joined to the hinge 20 via a connecting element 21, which, thanks to its elongated shape (with a characteristic length coinciding with that of the lower portion of the second storage compartment 7) and its substantially "C-shaped" cross-section 27, further allows creating continuity in the surface of wall 1; wrapping the lower edge of the second storage compartment 7 across its entire width, when the table 2 is in a closed configuration. Furthermore, the characteristic cross-section of this connecting element 21 allows the positioning of the table 2, when in open configuration, substantially parallel to the ground, forming an angle of substantially 90° with the surface of the wall 1, and its elements, such as the monitor 5' and the storage compartments 5, 7 and the object compartment 4.

In the context of the present invention, when the table 2 assumes the open configuration it is generally parallel to the floor of the cabin or parallel to the flight direction, which can vary by a few degrees with respect to the plane of the cabin.

Furthermore, when the table 2 assumes the open configuration it is substantially transversal to the rear surface of the wall, which can coincide with an angle of 90° but can also vary based on the orientation of the backrest of the seat placed frontally, which can have an inclination of approximately 7°-12°.

At one end of said connecting element 21 there is a support surface 22' having a substantially flat bulk, in particular trapezoidal or rectangular, which acts as a support surface for the table 2.

Constrained and placed adjacent above said support surface 22' there is a main use surface 22, which forms the main use surface of the table 2. This main surface 22 preferably recalls the shape of the support surface 22' in order to minimize the total size and the visual impact for the passenger in both the "open" and "closed" configurations.

Similarly to the lateral guide 26, there are rails 25 placed on said support plane 22' to allow the translation of the main plane 22 on the support plane 22' along a transverse direction of the support plane 22' parallel to a third axis z, transverse to said xy plane. In particular, said transverse direction of the support surface 22' is arranged transversally to the surface of the wall 1, when the table 2 is in an "open" configuration.

Said rails 25, in particular two rails 25 (to allow a symmetrical sliding of the main surface 22) therefore allow the arrangement of the table 2 in further intermediate configurations, compared to the "open" configuration, along said third z axis. In short, said rails 25 allow the adjustment of the distance between the passenger and the table within the space available between the passenger him/her-self and the wall 1, thus allowing to respond to the space needs of each passenger and also allowing the passenger to evacuate more easily if necessary.

At a lateral edge of the main surface 22, in particular on the same side where the first storage compartment 5 is present, according to the invention there is at least one hinge 23, in particular two hinges 23, to allow the installation of an additional surface 24. The added surface 24 is also capable of rotating around the rotation axis of the hinges 23, rotating through an angle between 0° and 180°, respectively in a first position (shown in FIG. 3), in which it rests above the main plane 22, and a second position (shown in FIG. 4), in which it is placed laterally and parallel to the main plane 22.

The first position of the surface 22 allows the passenger to use a smaller surface of the table 2, while when said surface 24 is in the second position, the usable surface of the table 2 increases, and the two half-tops 22 and 24 create a substantially continuous single surface.

Advantageously, these positions of the additional surface 24 allow the best use of the usually limited space available to the passenger inside the seat 100.

In order to allow the passenger to control the rotations and the translations of the table 2, and the translations of the main plane 22 of said table 2, according to the invention, friction systems 20', 25', and 26' are respectively present in correspondence with the elements involved in these sliding couplings.

In fact, at the hinge 20 there are, in particular a first friction system 20', mechanical elements suitable for interposing between the hinge 20 and the connecting element 21, thus increasing the torsional rigidity of this rotational coupling. In particular, said first friction system 20' comprises a plurality of inserts, preferably made of plastic, loaded by calibrated springs. This measure, therefore, allows the passenger to accompany the table 2 downwards during positioning in the "open" configuration, avoiding sudden and/or unexpected rotations, which could lead to breakage of the components in play or even damage the passenger himherself.

In correspondence with a portion of the lateral guide 26, inside said wall 1, there is a third friction system 26', consisting of cylindrical elements suitable for friction between the mobile part of the lateral guide 26 and the internal surface of the wall 1. In particular, said third friction system 26' provides a plurality of inserts, preferably made of plastic, loaded by calibrated springs.

Furthermore, there is a second friction mechanism 25', in particular the same as said third friction system 26', placed on said main plane 22 corresponding to the two rails 25, in particular positioned at the center of said main plane 22 between the two rails 25; this second friction system is capable of interposing between said support plane 22' and said main plane 22. In particular, said second friction system 25' comprises a plurality of inserts, preferably made of plastic, loaded by calibrated springs.

Similarly to said first friction system 20', the two friction systems 25' and 26' are capable of generating friction forces between the fixed and mobile components involved in the couplings of the lateral guide 26 and the rails 25 respectively.

Advantageously, said friction systems 25' and 26' allow the passenger, when using the table 2, to precisely adjust the position of the table 2 itself, and also allows the table 2 to maintain its configuration during its use, in particular when said table 2 it is in said "open" configuration.

In fact, the friction forces generated by said friction systems 25' and 26', similarly to said first friction system 20', make it possible to prevent any unexpected movements (due to movements of the aircraft or contact with the passenger) from moving the structure of table 2 thanks to the static friction present.

Again according to the invention, the wall 1 is suitable for being positioned in a backrest 1" of a seat 100 for airline passengers, in particular for seats 100 for business class passengers.

Figures 5, 6:
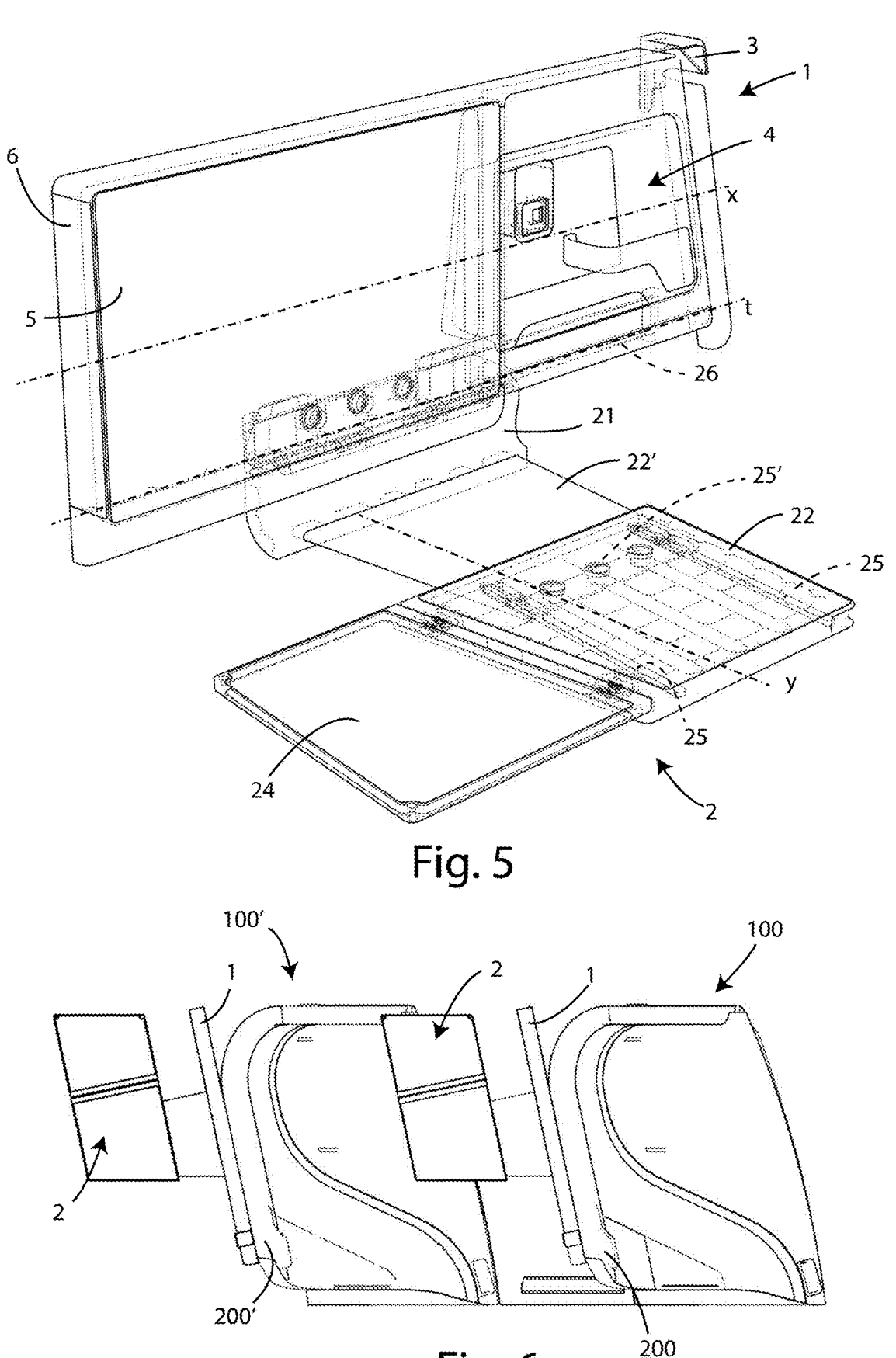
FIG. 5 shows a perspective view of the wall of FIG. 1 in a second open use configuration.
FIG. 6 shows a top view of a pair of seats on which two respective walls are installed according to the invention in said open use configuration.

With reference to FIG. 6, in fact, it is possible to visualize an overall configuration 100" composed of said wall 1 (in which a respective table 2 is in said "open" configuration) with a first seat 100 for aircraft, in which the wall 1 according to the invention is installed on a backrest 200 of the first seat 100, in particular on a rear surface of the backrest 100, and transversally to the surface of the aircraft, on which the first seat 100 is installed.

By adding a second seat 100' to the configuration, located behind the first seat 100, which accommodates a passenger, it is possible to obtain a secondary assembly configuration 200". In this secondary assembly configuration 200" a passenger positioned in the second seat 100' can use said table 2 of said wall 1, which is advantageously positioned between the passenger and the wall 1 itself.

Such configurations, if designed one after another, allow the creation of a row of seats 100, in which each seat 100, having said wall 1 installed on the backrest 200 of seat 100, allows each passenger seated in a respective rear seat 100 to use said table 2.

Advantageously, the wall 1 allows the deployment and the use of a table 2 for a passenger of seats 100 of aircraft 100 suitable for providing a work surface or for consuming food and drinks during the flight. In particular, since said table 2 does not include electronic components, it can be used by a passenger, without therefore requiring any intervention by specialized personnel and minimizing any malfunctions during use.

Advantageously, the snap coupling mechanism 3 represents an easy, intuitive and reliable coupling system, suitable for fastening the table 2 to the wall 1 during the flight phases, in which the mobile elements of the seats 100 must, given the safety regulations in force, remain stationary and positioned in the seats 100 of aircraft.

Advantageously, the configuration of the two storage compartments 5 and 7, combined with the fact that when said table 2 is in said "closed" configuration, allows the wall 1 to have a minimum size and at the same time to offer an architecture that allows the use of a monitor 5' and to store said table 2 in said second storage compartment, when said table is not used by the passenger.

In the foregoing, the preferred embodiments have been described and variations of the present invention have been suggested, but it is to be understood that those skilled in the art will be able to make modifications and changes without thereby departing from the relevant scope of protection, as defined by the claims. attached.

What is claimed is:

1. A wall for a backrest of aircraft seats comprising:
a rear surface on which a first storage compartment and a second storage compartment are formed,
wherein the first storage compartment is configured to house a monitor for multimedia entertainment during a flight, and wherein the first storage compartment is rigidly arranged in the wall,
wherein the first storage compartment comprises two lateral portions, including an upper portion and a lower portion extending along an extension axis parallel to a first axis (x),
wherein the wall further comprises:
a hinge, having a rotational rigidity, arranged at the wall; and
a table having one end bound to the hinge,
wherein the table is free to rotate about an axis of the hinge, and comprises a main plane,
wherein the second storage compartment is arranged adjacent to the first storage compartment, and is configured for positioning the table,
wherein the second storage compartment is arranged at one of the two lateral portions of the first storage compartment,
wherein the wall further comprises a lateral guide extending along the extension axis parallel to the first axis (x), the lateral guide arranged in correspondence with the lower portion of the first storage compartment and a lower portion of the second storage compartment,
wherein, by sliding on the lateral guide, the hinge is constrained to translate along the extension axis parallel to the first axis (x),
wherein the table has a first "closed" configuration, in which the table is arranged inside the second storage compartment so that the wall comprises a single continuous rear surface, and
wherein the table further has a second "open" configuration, in which the table is arranged transversely with respect to the single continuous rear surface of the wall in the first "closed" configuration and is free to translate along the extension axis parallel to the first axis (x) on the lateral guide through the hinge to be positioned beneath the first storage compartment or the second storage compartment.

2. The wall according to claim 1, further comprising the monitor housed within the first storage compartment.

3. The wall according to claim 1, wherein the second storage compartment comprises an object compartment therein.

4. The wall according to claim 1, wherein the table further comprises:
a support plane, configured to support the table and rigidly constrained at the hinge; and
at least one rail linearly extending along a transversal axis (z) of the support plane, wherein the transversal axis (z) is perpendicular to the first axis (x),
wherein the main plane is configured to translate along the support plane by sliding along the at least one rail.

5. The wall according to claim 4, wherein a second friction system is arranged in the main plane, the second friction system being configured for adjusting a stroke of the main plane on the at least one rail using a frictional force.

6. The wall according to claim 1, wherein the table further comprises at least one connecting element having a "C" cross-section, wherein the at least one connecting element comprises an end rigidly constrained to the hinge, and a further end rigidly constrained to a support plane of the table.

7. The wall according to claim 1, wherein the table further comprises:
at least one further hinge arranged at an edge of the main plane; and
an additional surface constrained to the at least one further hinge at an edge of the at least one further hinge and configured to rotate about an axis of the at least one further hinge.

8. The wall according to claim 1, wherein a snap coupling mechanism is arranged at a corner of the wall, the snap coupling mechanism configured to reversibly couple an end portion of the table with the wall when the table assumes the first "closed" configuration.

9. The wall according to claim 1, wherein the hinge is provided with a first friction system configured for increasing a torsional stiffness of a hinge connection between the table and the hinge using a frictional force.

10. The wall according to claim 1, wherein a third friction system is provided in the wall and at the lateral guide, the third friction system configured for adjusting a stroke of the table using a frictional force, by adjusting the hinge to slide on the lateral guide.

11. The wall according to claim 1, further comprising one or more friction systems, wherein each of the one or more friction systems comprises a plurality of inserts loaded by calibrated springs.

12. A seating assembly for an aircraft comprising:
at least one first passenger seat comprising a backrest and the wall according to claim 1,
wherein the wall is arranged in correspondence with the backrest.

13. The seating assembly according to claim 12, further comprising a second seating seat for passengers arranged at a rear of the at least one first passenger seat.

* * * * *